United States Patent [19]
Kleinsasser

[11] Patent Number: 5,749,323
[45] Date of Patent: May 12, 1998

[54] FLOORING SLAT FOR AN ANIMAL PEN

[76] Inventor: Jonathan Kleinsasser, Box 10, Ste. Agathe, Manitoba, Canada, R0G 1Y0

[21] Appl. No.: 573,934

[22] Filed: Dec. 18, 1995

[51] Int. Cl.$^6$ ........................................................ A01K 1/00
[52] U.S. Cl. ............................................ 119/530; 119/529
[58] Field of Search ................................... 119/528, 529, 119/530, 450

[56] References Cited

U.S. PATENT DOCUMENTS

| 4,048,960 | 9/1977 | Barnidge et al. | 119/529 |
| 4,796,563 | 1/1989 | Keuter | 119/530 |

FOREIGN PATENT DOCUMENTS

| 003012855 | 10/1981 | Germany | 119/529 |
| 3204754 | 8/1983 | Germany . | |
| 2006305 | 5/1979 | United Kingdom . | |
| 93/22905 | 11/1993 | WIPO | 119/529 |
| 95/18525 | 7/1995 | WIPO . | |

*Primary Examiner*—Gene Mancene
*Assistant Examiner*—Yvonne R. Abbott
*Attorney, Agent, or Firm*—Adrian D. Battison; Murray E. Thrift

[57] ABSTRACT

A slat for forming a flooring structure for a hog pen and particularly the area under the sow in a farrowing crate is rectangular with side edges which abut side edges of adjacent slats to align the slats in a row. Each side edge has tabs projecting outwardly to interlock above or below tabs on the next adjacent slat to prevent lifting of the slats. The slats have slots parallel to the end edges. The tabs at the side edges are arranged with spaces therebetween so that when abutting slots are formed between the slats which are at right angles to the slots in the slats. Each slat has a rib along its end edges raised from the upper surface with that rib being defined by an inner edge which is at right angles to the upper surface and a smoothly curved top edge and gradually inclined outer side so that the piglet can lie on the rib without discomfort but can gain purchase against the inner side to push inwardly onto the slat for suckling. The length of the slat is greater than 24 inches so that it can sit with its ends on top of an existing flooring spaced at exactly 24 inches. The slats can be held in place against longitudinal movement in such an existing flooring situation by insertion of angle irons under the edges of the existing flooring to stand up under the edges of the slats.

11 Claims, 5 Drawing Sheets

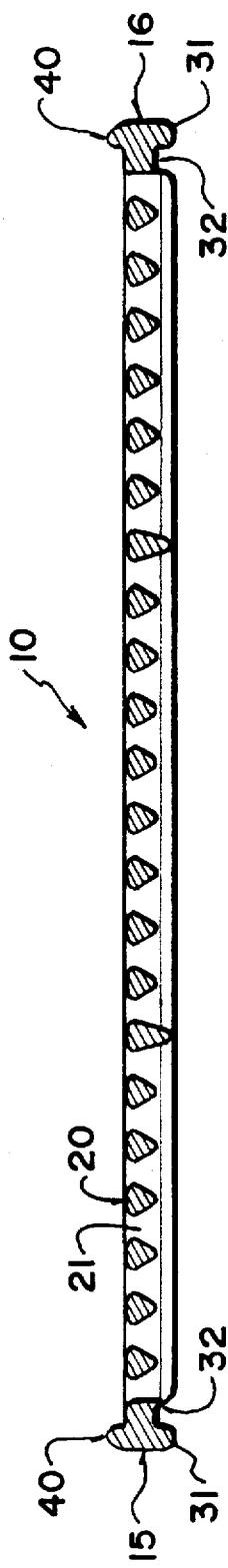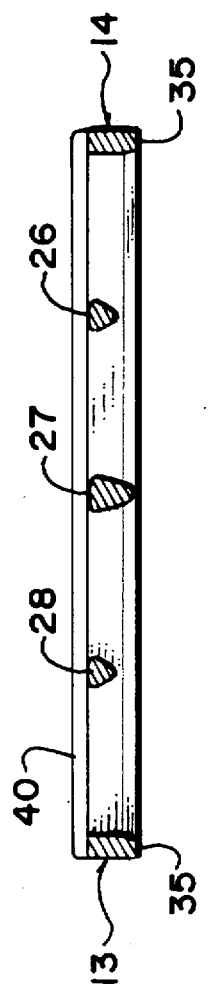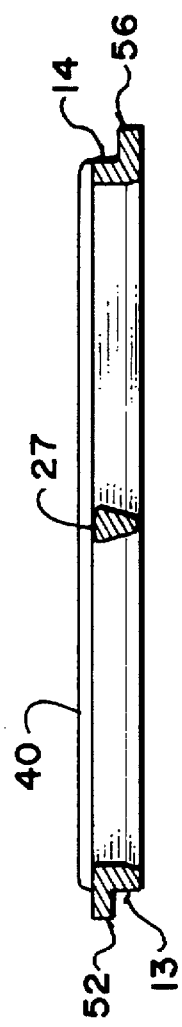
FIG. 3
FIG. 4
FIG. 5

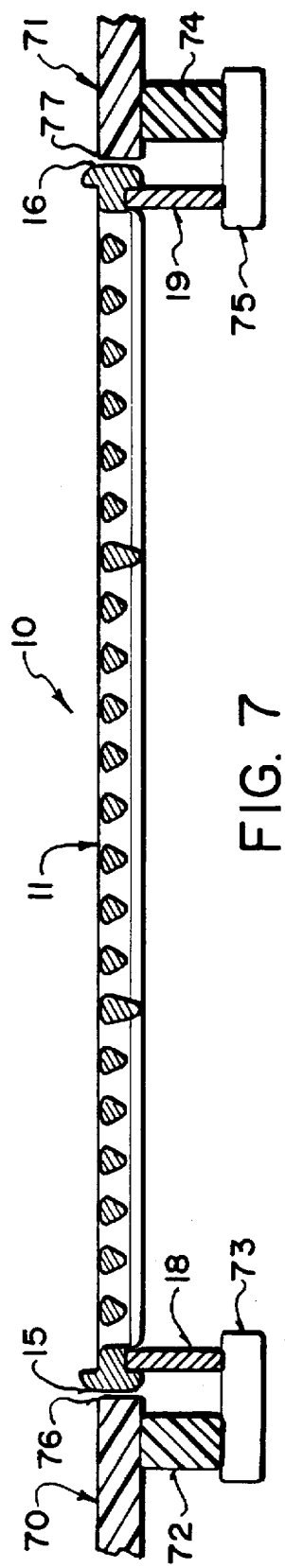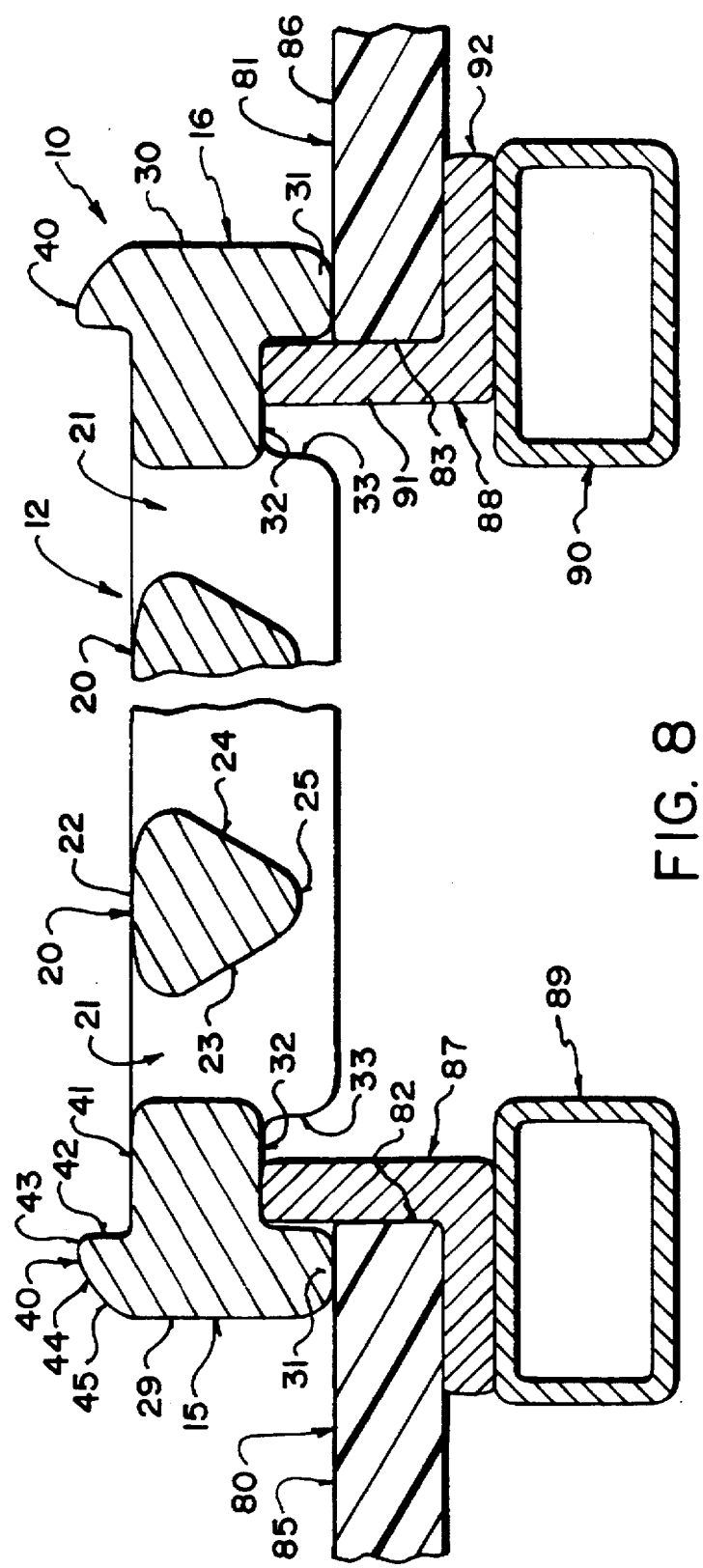

FLOORING SLAT FOR AN ANIMAL PEN

Attention is directed to co-pending application, Ser. No. 08/584,964, filed Jan. 11th 1996 which discloses and claims subject matter subject matter similar to that herein.

This invention relates to a flooring slat for an animal pen which intended to be used with a plurality of similar slats arranged so that end edges of the slats lie along a pair of common parallel lines with sides of the slats abutting to form a generally rectangular flooring area.

The flooring slat of the present invention is particularly but not exclusively designed for use in a farrowing crate for hogs in which the slats define a flooring area lying underneath the sow.

Such flooring slats have previously been manufactured and sold and are presently in wide use. Such flooring slats generally have a length of 24 inches and a width which is less than 24 inches so that when the slats are arranged side by side they define a flooring area of approximately 72 inches by 24 inches which is sufficient to receive the body of the sow when lying.

Such slats are generally formed of cast iron which has been found to provide sufficient strength to accommodate the heavy wear which occurs under the sow particularly when attempting to stand from the normal lying condition.

Such slats are generally formed with a series of parallel slotted perforations which extend across the width of the slat from one side edge toward the opposed side edge. In order to provide sufficient strength for the slat, the slotted perforations extend only partway across the width so as to form a series of such slotted perforations end to end across the width.

Such slats also include tabs at the side edges with at least one tab at each side edge being arranged at a top surface of the slat so as to overlie a corresponding tab at the second edge of the next adjacent slat which is arranged at the bottom surface of the slat. These tabs thus prevent the slats from being lifted each relative to the next.

The slats are generally supported on a pair of parallel vertical flanges each adjacent to but spaced slightly inwardly from a respective one of the end edges and the underside of each slat has downwardly projecting abutments which hold the slat in place on top of the flanges.

In one example of a slat of this type, a very shallow rib is provided along each end edge projecting upwardly from the upper surface by the distance of the order of 1/16 inch.

SUMMARY OF THE INVENTION

It is one object of the present invention to provide an improved slat for use in a floor structure.

According to the invention there is provided a floor slat of the type generally described above in which the foothold of the animal is improved by a space between the tabs abutting the next slat so as to define sots between the slats at right angles to the slots in the slats. In addition ribs are arranged along the ends of the slat. Yet further the slat is designed for mounting in an existing flooring by having a width greater than the existing space so as to sit proud of the existing edges. An angle iron support system is provided which supports the slat in its proud position.

One embodiment of the invention will now be described in conjunction with the accompanying drawings in which:

BRIEF DESCRIPTION OF THE DRAWINGS

FIG. 3 is a cross sectional view along the lines 3—3 of FIG. 1.

FIG. 4 is a cross sectional view along the 4—4 of FIG. 1.

FIG. 5 is a cross sectional view along the lines 5—5 of FIG. 1.

FIG. 7 is a cross sectional view longitudinally through one of the slats showing the mounting of the slats on a flooring support structure.

FIG. 8 is a cross sectional view of FIG. 7 on an enlarged scale showing a modified flooring support structure of a type arranged for insertion of the slats into an existing flooring In the drawings like characters of reference indicate corresponding parts in the different figures.

DETAILED DESCRIPTION

Figure 1:
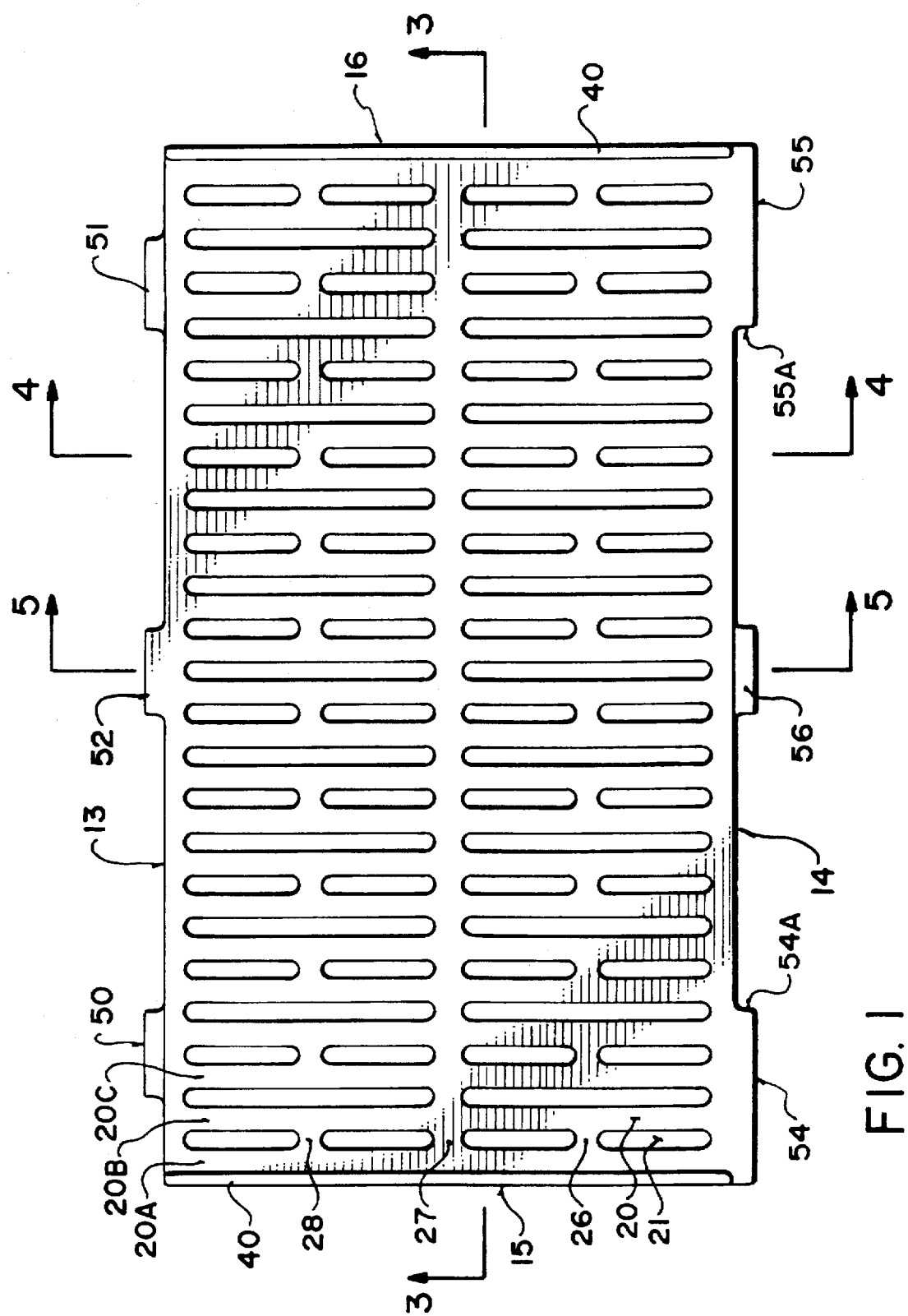
FIG. 1 is a top plan view of the slat of the present invention.

A flooring system for an animal husbandry pen, particularly a farrowing crate for pigs comprises a floor structure generally indicated at 10 defined from a plurality of horizontal slats 11, 12 which are arranged in side to side abutting relationship at abutting side edges 13 and 14 of the slats 11 and 12. The slats thus have end edges 15 and 16 together with the side edges 13 and 14 so that each slat is generally rectangular and all the slats are equal.

The slats are arranged in a row in side to side relationship and are mounted on a support structure defined by a pair of flanges 18 and 19 which hold the slats so the end edges 15 lie in a common line 15A and the end edges 16 lie in a common line 16A. The spacing between the lines 15A and 16A is thus equal to the length of the slat. The flooring structure has a dimension in a direction at right angles to the length of the slat which is equal to the sum of the widths of the slats.

In practice the distance between the lines 15A and 16A is of the order of 24 inches and the distance of the flooring structure at right angles to that distance is of the order of 84 inches that is 6 slats each having a width of 14 inches.

One of the slats is shown in detail in FIGS. 1 through 4. A slat is formed from cast iron which has sufficient strength to accommodate the forces from the heavy sow when lying, standing and particularly when attempting to stand from a lying position.

The slat is formed by bars each arranged at a respective one of the edges of the slat with those bars standing substantially vertically. Between the bars is formed a cast sheet defined by bars 20 which extend across the width of the slat from the side edge 13 to the side edge 14 with those bars being separated by slot shaped perforations 21. As shown in FIG. 3 each bar 20 has a convexly curved top surface in cross section. The top surface 22 has a central highest part and tapers gradually downwardly from the center part to each side surface 23, 24 of the bar. The side surfaces converge inwardly and downwardly substantially to an apex 25 defining the lower surface of the bar with that lower surface having a width significantly less than that of the upper surface. The converging sides 23 and 24 allow the shape of the bar to be cleaned by high pressure water or liquid spray so that the liquid spray jetted from above the slat can pass along each side 23, 24 and can reach or substantially reach the apex 25 thus cleaning the whole of the bar from the upper surface.

The bars 20 are interconnected along their length by longitudinally extending connecting pieces 26, 27 and 28.

Thus as best shown in the plan view of FIG. 1, a first bar 20A is connected to a second bar 20B by four such interconnecting pieces. The second bar 20B is connected to a third bar 20C only by one interconnecting piece which is arranged centrally of the bars. Thus between the first and second bars is provided four separate slots 21. Between the second and third bars is provided two separate slots 21. The slots are arranged in rows and columns to form an array with the slots generally parallel to the end edges 15 and 16 and spaced longitudinally of the side edges.

Figure 2:
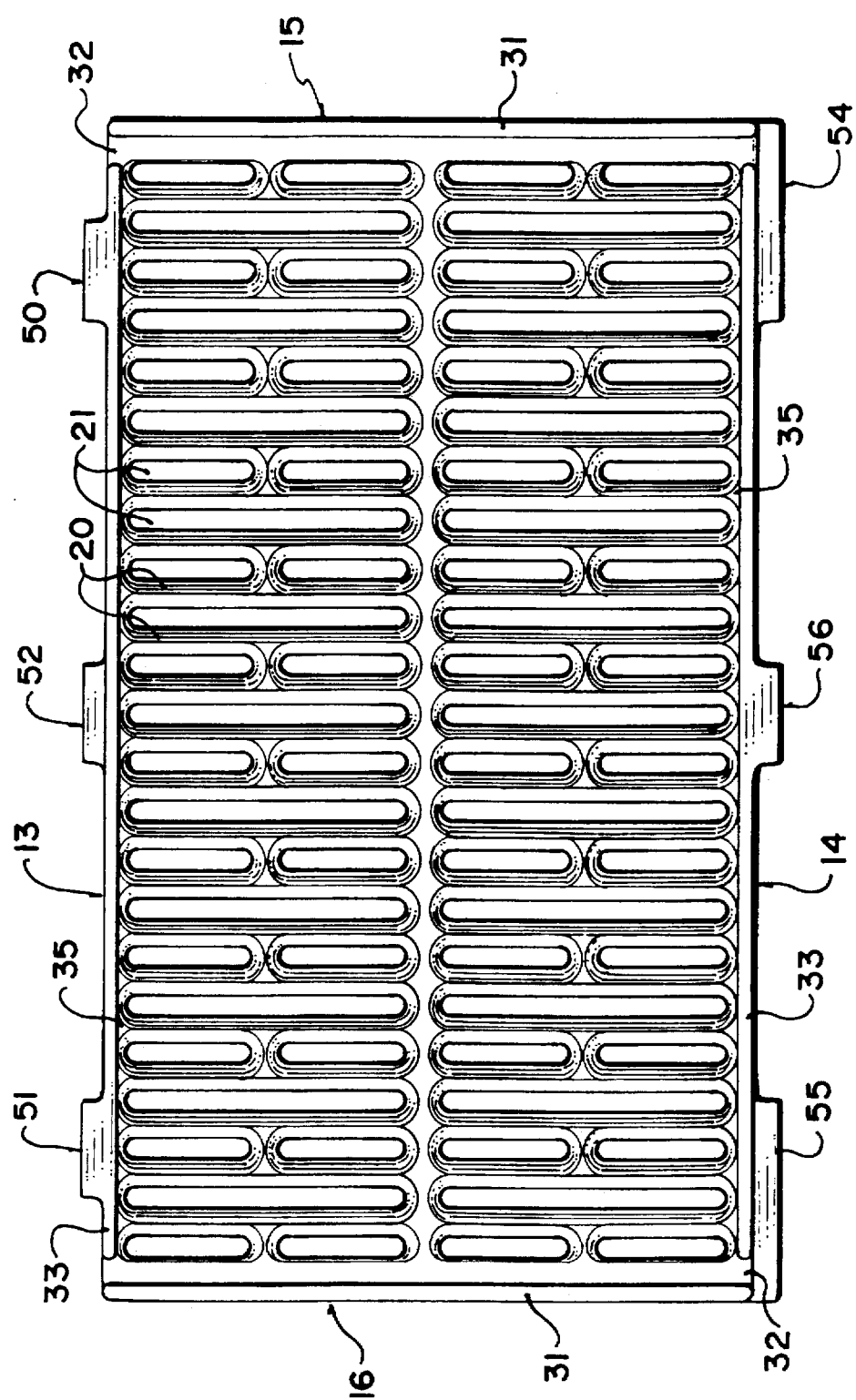
FIG. 2 is a bottom plan view of the present invention.

At the end edges 15 and 16 the vertical bar defining each end edge has an outer surface 29 facing outwardly away from the body of the slat. Similarly the end edge 16 has a surface 30 facing away from the body of the slat in a direction opposite to the surface 29. The bottom of the bar at each end edge comprises a rib 31 extending along the end edge and defining on the bottom surface of the slat a recess 32 inwardly of the rib 31 for receiving a respective one of the flange members 18 and 19. The recess 32 on its inner side 33 is defined by one or more downwardly depending tabs at spaced positions across the width of the slat. Thus the recess 32 defined on one side by the rib 31 on the other side by the tabs 33 holds the flange 18, 19 in place and prevents side to side movement of the slat relative to the flanges. As shown in FIG. 2, the tabs 33 are arranged only at the sides of the slat and are in effect defined by the bottom part of the bar 35 forming the structure of the slat at the respective side edge 13, 14.

The top part of the bar forming the end edge 15, 16 forms an upstanding rib 40 which stands upwardly from an upper surface 41 of the slat which is defined by the upper surfaces 22 of the bars 20 and that portion of the body of the slat which is above the recess 32 which is in a common plane with the top of the bars 20.

The rib 40 is provided to define a resisting surface tending to engage the foot of the animal when sliding or moving longitudinally of the slat and thus to resist such sliding movement of the foot of the animal and to assist the animal in gaining foothold and standing from a lying position. Thus the rib 40 has an inner surface 42 which is substantially at right angles to the horizontal upper surface 41 of the slat and stands upwardly therefrom to a height of the order of 0.2 inches. From the inside surface 42, the rib 40 is smoothly curved in an arcuate radiused section 43 into a top surface 44 and then a downwardly inclined side surface 45 which intersects the vertical surface 29 defined in the end edge of the slat. The portion of the rib defined by the surface portions 43, 44 and 45 is smoothly curved with relatively wide radius of curvature so that a piglet lying on the rib is not presented with sharp edges which could cause discomfort. At the same time the vertical surface 42 allows the piglet again to gain purchase on the rib so that the piglet can push forwardly against the surface 42 to push its snout into the stomach of the sow for gaining access to the nipples.

The specific shape of the rib therefore gives purchase on the inside for the sow and the piglets and yet avoids the presentation of sharp edges particularly on the top and outer surface which could cause discomfort to the suckling piglet. More particularly the angle of inclination of the side 45 of the rib is very much less than that of the 90° of the side 42 and is generally of the order of 45° which provides a smooth intersection with the vertical surface 29.

Each of the side edges 13 and 14 includes a plurality of tabs which project outwardly from the side edge in a plane which is generally parallel to the upper surface 41 of the slat. These tabs in general are arranged to overlap so as to prevent lifting of one slat relative to the next. Thus the side edge 13 includes two end tabs 50 and 51 together with a single intermediate tab 52. Each of the tabs has a height relative to the edge which is approximately equal to or slightly less than one half of the edge height. As will be apparent from a comparison of FIGS. 1 and 2, the tabs 50 and 51 are arranged at the bottom of the edge 13 and the tab 52 is arranged at the top of the edge.

The edge 14 similarly includes tabs 54, 55 and 56. The tabs 54 and 55 are arranged at the top of the edge 14 and the tab 56 is arranged at the bottom of the edge 14. The tabs 54 and 55 extend from the respective adjacent end edge 15, 16 to an end of the tab 54A, 55A which is spaced from the respective end edge and is also spaced from the tab 56. Thus the tabs 54 and 55 are wider than the tabs 50 and 51 since those tabs are spaced from the respective end edge 15, 16. The tab 56 is however substantially coextensive with the tab 52.

Each of the tabs has an outer edge which is directly parallel to the associated side edge of the slat and the width of the tabs that is the distance projecting outwardly from the side edge is equal for each of the tabs.

Figure 6:
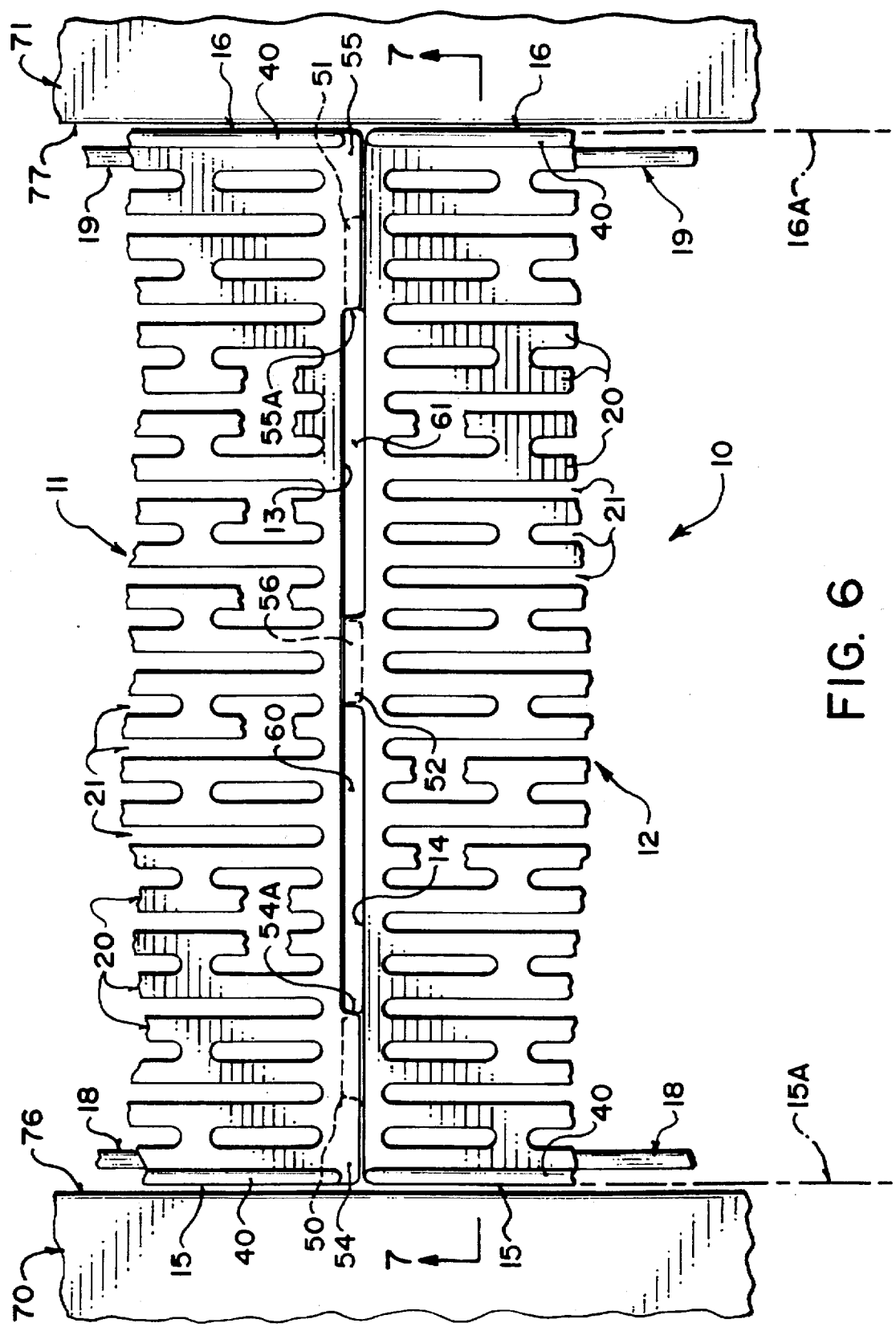
FIG. 6 is a top plan view showing the abutment between the sides edges of two of the slats.

In the position shown in FIG. 6, the slats are arranged in he side to side abutting position in which the side edge of one slat 11 is arranged immediately adjacent the side edge 14 of the next adjacent slat 12. It will be appreciated therefore that the outside edges of the tabs actually abut the side edge of the next adjacent slat. Since the tabs are all of the same width, the side edges 13 and 14 of the slats are held spaced by a distance equal to the width of the tabs. Thus as shown in FIG. 6, the tab 54 overlies the tab 51, the tab 55 overlies the tab 50 and the tab 52 overlies the tab 56. Thus the tabs 51 and 50 hold down the edge 14 of the slat 12 and the tab 56 holds down the edge 13 of the slat 11 so that neither slat can be lifted at these abutting edges.

The end 54A of the tab 54 is spaced outwardly from the tab 52 thus leaving a slot shaped opening 60 between the end 54A and the tab 52. This slot shaped opening 60 thus forms a perforation through the flooring at the junction between the edges 13 and 14 and allows material to fall through the flooring at this position. A similar slot shaped perforation 61 is located between the tab 52 and the edge 55A of the tab 55. These slot shaped perforations are thus arranged so that the longitudinal direction is at right angles to the longitudinal direction of the slot shaped perforations 21 in the slat itself. These slots 60 and 61 thus form a foothold allowing improved purchase for the animals foot in a direction transverse to the length of the slats lies along the length of the flooring structure itself.

Turning now to FIG. 7, the flooring structure defined by the plurality of slats mounted on the flanges 18 and 19 form as a part of a whole flooring structure including a first sheet of flooring material 70 and a second sheet 71 of the same or similar flooring material. The type and construction of the flooring material 70, 71 can vary in accordance with requirements and is well known to one skilled in the art and will therefore not be described herein. The edge of the sheet 70 is mounted on a suitable support beam 72 carried on a main support member 73 which carries the flange 18. Similarly the edge of the sheet 71 is carried on a beam 74 again mounted on a main support 75 which supports the flange 19. The sheet 70 thus has an edge 76 abutting the end edges 15 of the slats. Similarly the sheet 71 has an end edge 77 abutting the end edges 16 of the slats. Thus the flooring is effectively continuous and is made up of the sheets 70, 71 and the slats 11, 12 etc.. All of the flooring is of a type which can be cleaned by injection of a cleaning fluid. All of the flooring materials have perforations or openings so that the manure from the animals can fall through the perforations or slots into a pit (not shown) underneath the supports 73 and 75.

Turning now to FIG. 8, there is shown a modified support assembly for the flooring which can be used in a situation where an existing flooring has worn in the area under the sow and thus requires replacement only in that area leaving two sheets 80 and 81 of existing flooring material which is similar acceptable condition since it lies under the area where the piglets will be confined. The sheet 80 has an end edge 82 and the sheet 81 has an end edge 83. In practice such flooring is manufactured so that the edges 82 and 83 are spaced by exactly 24 inches. In the construction shown in FIG. 8, therefore, it will be appreciated that a panel or portion of the flooring has been removed at the area under the sow and that portion has a width exactly equal to 24 inches so that it sits with the edges of the removed section normally lying in abutting position against the edges 82 and 83.

The slats as described herein before are however manufactured with a length which is greater than 24 inches and preferably of the order of 24.5 inches so that lengths of the slats between the end edges 15 and 16 is greater than the distance between the edges 82 and 83. Thus the slats stand on top of the upper surfaces 85 and 86 of the sheets 80 and 81. The bottom of the rib 31 thus sits directly on the top surface 85, 86 and supports the slat at a position above the existing flooring defined by the sheets 80 and 81.

In order to locate the slats and prevent movement of the slats relative to the existing sheets 80 and 81 in a direction longitudinal of the slats, a pair of angle irons 87 and 88 are inserted under the edges 82 and 83 respectively of the sheets 80 and 81 and on top of the existing support beams 89 and 90 which would normally carry the end edges 82 and 83 together with the end edges of the panel which has been removed. Thus each angle iron 87, 88 has a pair of legs 91 and 92 which are arranged at right angles. The angle irons 87 and 88 extend along the intended area of the flooring structure and preferably lie along the full length defined by the side-by-side slats. The leg 92 of each of the angle irons is simply slipped underneath the edge of the respective sheets so that the leg 92 is fully covered by the sheet. Thus the edge 83 of the sheet abuts the inside surface of the leg 91. This prevents any contamination from collecting in the area between the leg 91 and the edge 83. The leg 91 stands upwardly beyond the upper surface 86 and thus projects into the recess 32 of the slat to abut the side surfaces of the recess 32 and thus prevent the movement of the slat in the longitudinal direction of the slat.

The manufacture of the slat therefore in a length greater than the 24 inches between the edges 82 and 83 allows the slat to be used as a replacement of renovation in which the slat sits on top of the existing flooring and there is provided a suitable abutment system which in the example shown is constituted by the angle irons to prevent the longitudinal movement of the slat which could allow it to fall into the opening between the edges 82 and 83.

The angle irons 87 and 88 are held in place simply by frictional engagement between the top surface of the beam 89, 90 and the undersurface of the flooring sheet.

In the renovation process, the worn sheet is simply removed from the area between the edges 82 and 83 and the angle irons inserted in place simply by lifting the edge 82, 83 away from the supporting beam allowing the angle iron to be pressed in place and held in place on top of the beams 89, 90. Thus with the flanges 91 standing upwardly, the slats can simply be dropped into place with the tabs interlocking as previously described thus holding the flooring structure properly in place without possibility of movement longitudinally nor transversely.

In an alternative arrangement (not shown) the angle irons 87 and 88 can be omitted and the slats simply placed so that the ribs 31 sit on top of the surfaces 85 and 86. In this arrangement the slats themselves are formed with projecting tabs (not shown) which extend downwardly into the opening so as to abut the surfaces 82 and 83 to prevent the longitudinal movement of the slats. For this purpose, of course, the slat must have a length greater than the space between the edges 82 and 83 which is sufficient to provide the necessary support for the slat which is carried only at those portions of the slat which extend outwardly beyond the edges 82 and 83.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A floor structure for an animal containment pen comprising:

a plurality of generally rectangular slats;

each slat having an upper surface for receiving the animal thereon, two end edges spaced by a length of the slat and two side edges spaced by a width of the slat;

a support structure for supporting the slats in a row in side by side relationship so that the end edges of the slats at one end lie in a first common line along one side of the floor structure and the end edges at an opposed end lie in a second common line parallel to the first common line along an opposed side of the floor structure so that the floor structure has a first dimension equal to a length of the slats and a second dimension at right angles to the first dimension which is the sum of the widths of the plurality of the slats;

wherein each slat includes on the upper surface thereof at the end edges thereof a respective one of a pair of raised ribs each of which is shaped to provide an inner side of the rib and an outer side of the rib standing upwardly from the upper surface and a top surface of the rib, the inner side of the rib having an angle to the upper surface which is greater than an angle of the outer side of the rib relative to the upper surface.

2. The floor structure according to claim 1 wherein the inner side of the rib is substantially at right angles to the upper surface.

3. The floor structure according to claim 1 wherein the top surface of the rib and the outer side of the rib are smoothly curved from a top of the inner side of the rib outwardly and downwardly to intersect with a vertical surface at the end edge.

4. A floor structure for an animal containment pen comprising:

a first flooring sheet having an upper surface for receiving the animal thereon with a first horizontal end edge of the sheet lying in a first common line;

a support framework supporting th e sheet including a framework member at the common line for supporting the end edge of the sheet;

at least one rectangular slat, the slat having an upper surface for receiving the animal thereon, first and second end edges spaced by a length of the slat and two side edges spaced by a width of the slat;

and at least one support element supporting one end edge of the slat at said first end edge of the flooring sheet;

said support element comprising an edge strip member including engagement means thereon engaging the flooring sheet at the end edge thereof and engaging the framework member such that the support element is held in position by the engagement means and extends along the common line;

the edge strip member having a width of the edge strip member in a direction transverse to the common line which is less than a length of the edge strip member;

the edge strip member and the slat having cooperating abutment members thereon by which the slat is located on the edge strip member and prevented from movement thereon in a direction transverse to the common line;

the edge strip member including a horizontal flange member projecting outwardly away from the end edge of the slat and being located between a bottom surface of an edge portion of the flooring sheet and a top surface of the framework member.

5. The floor structure according to claim 4 wherein the abutment member on the edge strip member comprises flange extending upwardly from the horizontal flange member and the abutment member on the slat comprises a recess for receiving the flange there in.

6. The floor structure according to claim 5 wherein the flange extends substantially along the full length of the edge strip member.

7. The floor structure according to claim 4 wherein the edge strip member defines a substantially straight edge a face thereof opposite the flooring sheet.

8. The floor structure according to claim 4 wherein the flooring sheet comprises a plurality of floor panels, each panel having an upper surface for receiving the animal thereon, first and second end edges spaced by a length of the panel and two side edges spaced by a width of the panel, the panels being arranged in a row with the first end edges lying on the common line.

9. The floor structure according to claim 8 wherein the panels are molded from a plastics material and the slat is formed from cast iron.

10. The floor structure according to claim 4 including a second sheet of flooring material wherein each of the has an end edge with the end edges spaced to defining an opening therebetween, the slat being arranged such that the length thereof bridges the opening between the end edges of the sheets, the end edge of the second sheet also including an edge strip member thereon for supporting an adjacent end edge of the slat.

11. The floor structure according to claim 4 wherein the abutment member on the edge strip member and the horizontal flange member are formed by an elongate metal right angle member.

* * * * *